US006996740B2

(12) United States Patent
Ro

(10) Patent No.: US 6,996,740 B2

(45) Date of Patent: Feb. 7, 2006

(54) METHOD OF OPTIMIZING DESIGN PARAMETERS OF DATA STORAGE SYSTEM AND METHOD OF APPLYING OPTIMIZED DESIGN PARAMETERS

(75) Inventor: Cheong-Rae Ro, Gumi-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 491 days.

(21) Appl. No.: 10/155,022

(22) Filed: May 28, 2002

(65) Prior Publication Data

US 2002/0178406 A1 Nov. 28, 2002

(30) Foreign Application Priority Data

May 28, 2001 (KR) .............................. 2001-29411

(51) Int. Cl.
*G06F 11/00* (2006.01)

(52) U.S. Cl. .............................. 714/5; 714/47; 360/66

(58) Field of Classification Search .................... 714/5, 714/47; 360/66

See application file for complete search history.

(56) References Cited

U.S. PATENT DOCUMENTS

| | | | | |
|---|---|---|---|---|
| 5,408,367 | A * | 4/1995 | Emo | 360/53 |
| 5,412,518 | A * | 5/1995 | Christner et al. | 360/66 |
| 5,455,717 | A * | 10/1995 | Van Doorn et al. | 360/6 |
| 5,978,163 | A * | 11/1999 | Cunningham | 360/66 |
| 6,078,455 | A * | 6/2000 | Enarson et al. | 360/68 |
| 6,124,998 | A * | 9/2000 | Kanegae | 360/68 |
| 6,188,531 | B1 * | 2/2001 | Chang et al. | 360/46 |
| 6,249,890 | B1 * | 6/2001 | Ukani et al. | 714/721 |
| 6,282,038 | B1 * | 8/2001 | Bonaccio et al. | 360/46 |
| 6,359,743 | B1 * | 3/2002 | Patti et al. | 360/25 |
| 6,490,115 | B1 * | 12/2002 | Suzuki et al. | 360/75 |
| 6,556,366 | B2 * | 4/2003 | Patti et al. | 360/66 |
| 6,574,061 | B1 * | 6/2003 | Ling et al. | 360/66 |
| 6,744,586 | B2 * | 6/2004 | Ukani et al. | 360/69 |
| 6,751,039 | B1 * | 6/2004 | Cheng et al. | 360/66 |

FOREIGN PATENT DOCUMENTS

| | | |
|---|---|---|
| GB | 2 341 267 | 8/2000 |
| KR | 2000-32010 | 6/2000 |
| KR | 2000-47527 | 7/2000 |
| WO | 93/1052 | 5/1993 |

OTHER PUBLICATIONS

Self-healing Actuator Servo for Hard Drive Disks, pp. 736-743, IBM Technical Disclosure Bulletin (Apr. 2000).

* cited by examiner

*Primary Examiner*—Robert Beausoliel
*Assistant Examiner*—Gabriel L. Chu
(74) *Attorney, Agent, or Firm*—Staas & Halsey LLP

(57) ABSTRACT

A method of optimizing design parameters of a data storage system in which a failure of products is caused by changes in the time required for using the products and characteristics of the products is pre-estimated. Design parameters used in a signal processing circuit in the pre-estimated failure condition are optimized and stored. A signal is processed using the design parameters optimized in the pre-estimated failure condition if errors occur due to changes in conditions of use of the data storage system. According to the method, the period and frequency of use of the data storage system can considerably be extended.

35 Claims, 6 Drawing Sheets

| FIR | FR0 | FR1 | FR2 | FR3 | FR4 | FR5 | FR6 |
|---|---|---|---|---|---|---|---|
| A(FIR fr B/I) | FF | 5 | EC | 4E | EB | 9 | FE |
| B(FIR fr ATW+5K) | 0 | 3 | E0 | 5E | E0 | 5 | 0 |
| Half of A & B's FR2 & 4) | 0 | 5 | e8 | 4a | e8 | 5 | 0 |

METHOD OF OPTIMIZING DESIGN PARAMETERS OF DATA STORAGE SYSTEM AND METHOD OF APPLYING OPTIMIZED DESIGN PARAMETERS

CROSS-REFERENCE TO RELATED APPLICATION

This application claims the benefit of Korean Patent Application No. 2001-29411, filed May 28, 2001, in the Korean Intellectual Property Office, the disclosure of which is incorporated herein by reference.

BACKGROUND OF THE INVENTION

1. Field of the Invention

The present invention relates to a method of setting and applying design parameters of a data storage system, and more particularly, to a method of optimizing design parameters of a data storage system in which a failure of products caused by changes in the time required to use the products and characteristics of the products is pre-estimated, design parameters used in a signal processing circuit in the pre-estimated failure condition are optimized to be stored, and a signal is processed using the design parameters optimized in the pre-estimated failure condition when errors occur due to changes in conditions of use of the data storage system and a method of applying the optimized design parameters.

2. Description of the Related Art

In general, a failure necessarily occurs in all of parts that make up a system due to the passage of time and the use of the system. For instance, a coercive force of a storage medium changes in a hard disk drive, which is one type of data storage system, depending on the passage of time and the frequency of use. As a result, a magnetized signal is damped.

Also, the performance of a head is deteriorated by the repetitive use (read/write) of the head. The deterioration of the performance is not a problem in the early stage of the use of head, but causes a failure of the head as time passes. Such a deterioration makes an electrical signal inappropriate for use in a process of converting an analog signal stored in a storage medium into a digital signal that is user data. As a result, errors occur and, ultimately, a failure of the product is caused.

A conventional method of setting design parameters of a hard disk drive equally determines write current, read current, and various filter coefficients in a burn-in process having general test conditions. These coefficients have an important effect on a read characteristic of the hard disk drive and are optimized in a current state of each part. However, parts of the hard disk drive deteriorate over time.

Specifically, a read sensor, in charge of the read characteristic, has a shorter life than other parts. Thus, the shortened lifespan of the read sensor deteriorates the overall performance of the entire hard disk drive in a short time, thereby causing a failure of the hard disk drive. However, the design parameters fixed by the conventional method are unsuitable for accounting for the lifespan characteristic of the read sensor in which coefficients are changed due to the deterioration of the read sensor by the passage of time and the repetitive use of the system. As a result, it is impossible to optimize the system and, finally, a read error occurs and the entire system fails to process a signal.

SUMMARY OF THE INVENTION

To solve the above and other problems, it is an object of the present invention to provide a method of optimizing design parameters of a data storage system in which changes in characteristics of a product caused by the passage of time and the frequency of use of the product are pre-estimated to form a pre-estimated condition, design parameters to optimize the data storage system in various conditions including a loss condition are stored, and a signal is processed using the design parameters optimized in accordance with the pre-estimated condition when errors occur due to changes in conditions of use of the data storage system.

It is another object of the present invention to provide a method of applying the optimized design parameters.

Additional objects and advantages of the invention will be set forth in part in the description which follows and, in part, will be obvious from the description, or may be learned by practice of the invention.

Accordingly, to achieve the above and other objects, a method of optimizing design parameters of a data storage system according to an embodiment of the invention includes determining and storing first design parameters to optimize the data storage system in accordance with a general burn-in test condition, generating a progressive failure condition pre-estimated in the data storage system, setting and storing third design parameters to optimize the data storage system in accordance with the pre-estimated progressive failure condition.

According to another embodiment of the present invention, a method of applying optimized design parameters of a data storage system when processing a signal includes applying first design parameters to the data storage system optimized in accordance with a general burn-in test condition to process a signal, applying third design parameters optimized in accordance with a progressive failure condition to the data storage system to re-process the signal when errors occur when processing the signal using the data storage system to which the first design parameters have been applied.

According to a further embodiment of the present invention, a method of applying optimized design parameters of a data storage system when processing a signal in the data storage system includes applying first design parameters optimized in accordance with a general burn-in test condition to the data storage system to process a signal, applying second design parameters, which are set to averages of third design parameters optimized in accordance with a progressive failure condition and the first design parameters, to the data storage system to re-process the signal when errors occur when processing the signal using the data storage system to which the first design parameters have been applied, applying the third design parameters to the data storage system to re-process the signal when errors occur when re-processing the signal using the data storage system to which the second design parameters have been applied.

BRIEF DESCRIPTION OF THE DRAWINGS

The above and other objects and advantages of the present invention will become more apparent and more readily appreciated by describing in detail embodiments thereof with reference to the accompanying drawings in which.

DETAILED DESCRIPTION OF THE EMBODIMENTS

Figure 1:
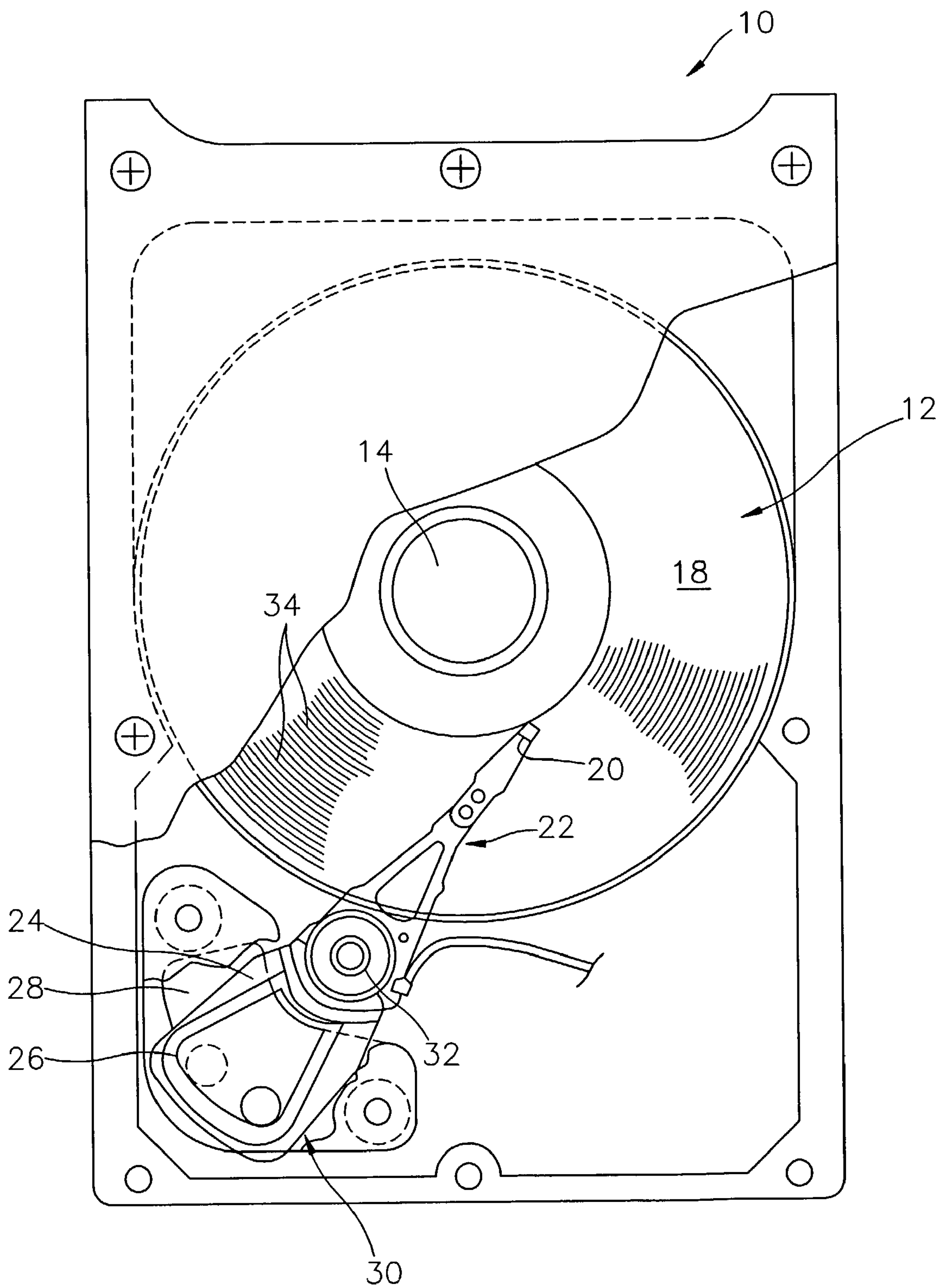
FIG. 1 is a plan view of a hard disk drive according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a plan view of a hard disk drive 10 according to an embodiment of the present invention. The hard disk drive 10 includes at least one magnetic disk 12, which is rotated by a spindle motor 14. The hard disk drive 10 also includes a transducer (not shown), which is located adjacent to a disk surface 18. The transducer senses and/or magnetizes a magnetic field of the magnetic disk 12 to read or record data from or to the magnetic disk 12, which is being rotated by the spindle motor 14. In general, the transducer is in contact with the disk surface 18. The transducer is described as a single transducer, but it is understood that the transducer includes a recording transducer to magnetize the magnetic disk 12 and a reading transducer, which is separate from the writing transducer, to sense the magnetic field of the magnetic disk 12. The reading transducer includes a magnetoresistive (MR) device according to an embodiment of the invention. Further, it is understood that other types of transducers can be used using the reading or writing transducers individually or using a unitary transducer performing both reading and writing operations.

The transducer is integrated into a head 20 in the embodiment shown in FIG. 1. The head 20 generates an air bearing between the transducer and the disk surface 18. The head 20 is combined into a head stack assembly (HSA) 22. The HSA 22 is attached to an actuator arm 24 having a voice coil 26. The voice coil 26 is adjacent to a magnetic assembly 28 which includes a voice coil motor (VCM) 30. Current supplied to the voice coil 26 generates torque which rotates the actuator arm 24 with respect to a bearing assembly 32. The rotation of the actuator arm 24 moves the transducer across the disk surface 18.

Information is generally stored in an annular track 34 of the magnetic disk 12. As shown in FIG. 1, each track 34 generally includes a plurality of sectors. Each sector includes data fields and identification fields. The identification field includes a Gray code to identify a sector and a track 34 (cylinder). The transducer moves across the disk surface 18 to read or record information on another track 34.

Figure 2:
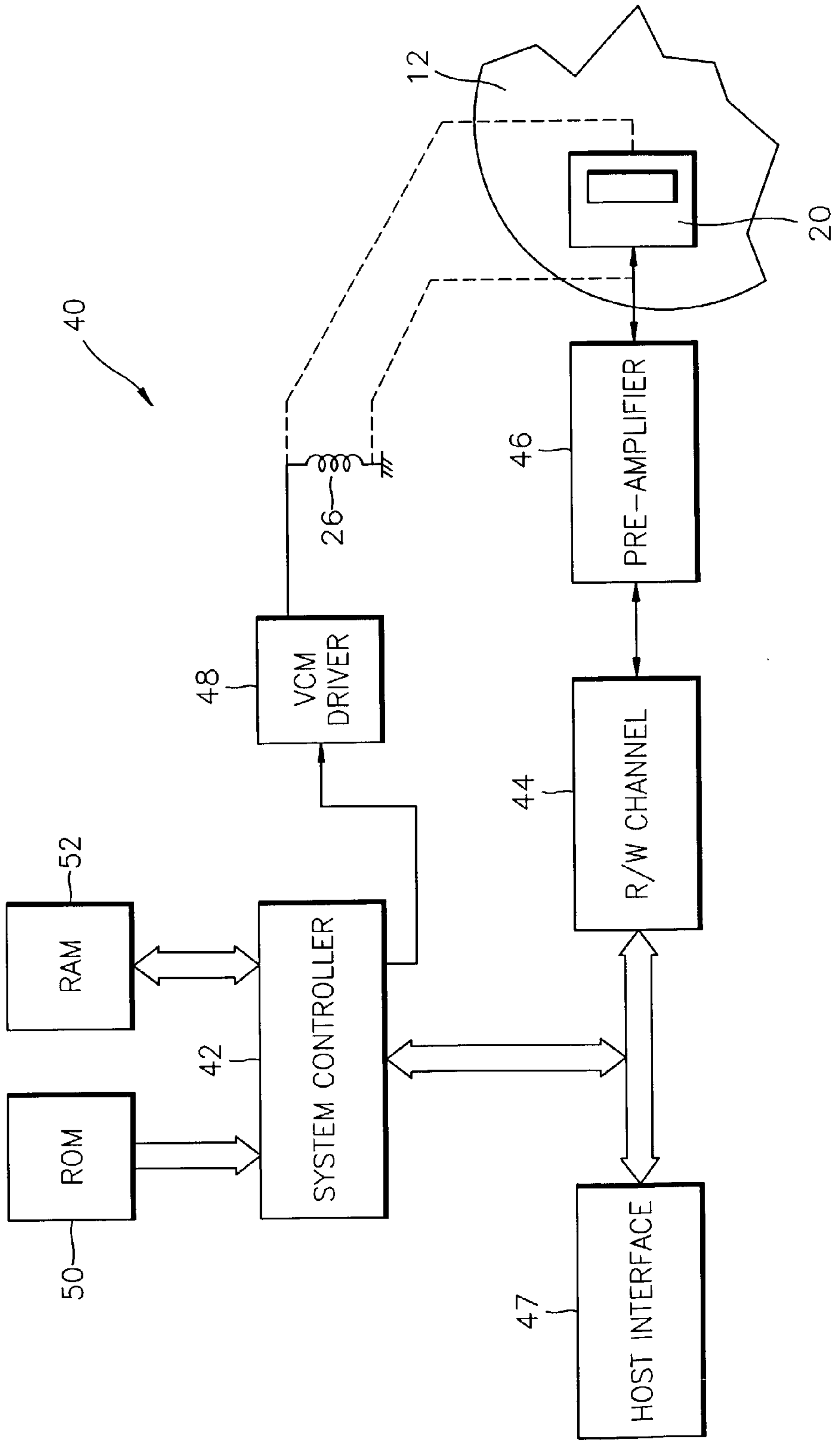
FIG. 2 is a circuit diagram of a system to control a hard disk drive shown in FIG. 1.

FIG. 2 shows a system 40 which controls the hard disk drive 10. The system 40 includes a system controller 42, which is connected to the head 20 via a read/write (R/W) channel circuit 44 and a pre-amplifier circuit 46. The system controller 42 may be a digital signal processor (DSP), a microprocessor, a micro-controller, and the like according to embodiments of the invention. The system controller 42 supplies a control signal to the R/W channel circuit 44 to read information from the disk 12 or write information on the disk 12. Information is generally transmitted from the RNV channel circuit 44 to a host interface circuit 47. The host interface circuit 47 includes a buffer memory and a control circuit, which permits the hard disk drive 10 to interface with a system such as a personal computer.

The system controller 42 is connected to a voice coil motor (VCM) driver 48 which supplies driving current to the voice coil 26. The system controller 42 supplies a control signal to the VCM driver 48 to control the excitation of the VCM driver 48 and the operation of the transducer. The system controller 42 is connected to a non-volatile memory such as a read only memory (ROM) or a flash memory device 50, and a random access memory (RAM) device 52. The memory devices 50 and 52 individually or in combination include commands and data used by the system controller 42 to execute a software routine to control the hard disk drive 10. The software routine includes a seek routine which moves the transducer from one track to another track. The seek routine includes a servo control routine to guarantee the movement of the transducer to an accurate track.

The memory devices 50 and 52 store first and third design parameters, and optionally, second design parameters. The first design parameters optimize the data storage system in a general burn-in test. The third design parameters optimize the data storage system in a pre-estimated progressive failure condition according to the present invention. The second design parameters are an average of the first and third design parameters.

Figure 3:
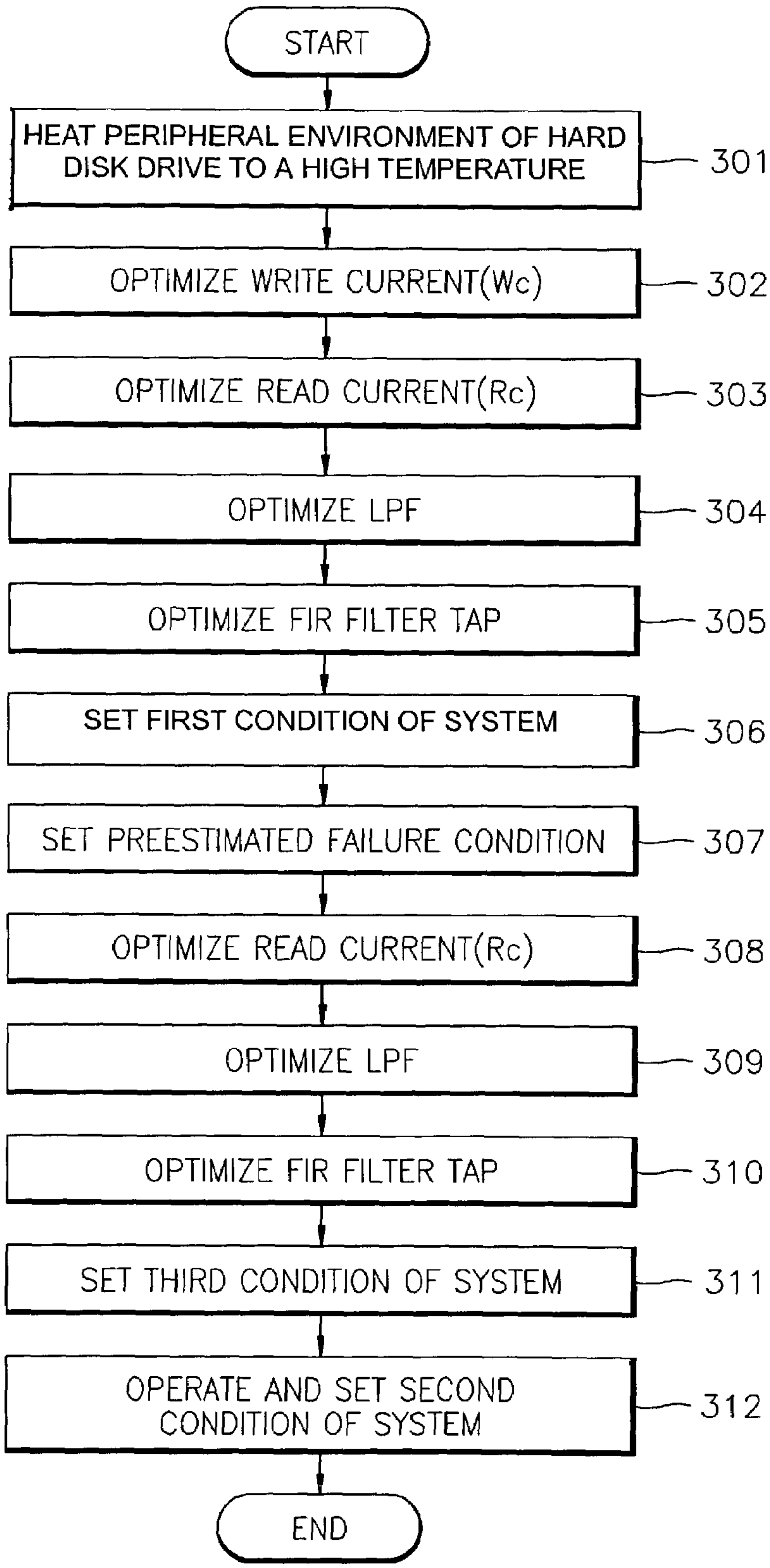
FIG. 3 is a flowchart of a method of optimizing design parameters of a data storage system according to another embodiment of the present invention.

FIG. 3 is a flowchart of a method of optimizing design parameters of a data storage system according to an embodiment of the present invention. Operations 301 through 306 correspond to a general burn-in test process. Specifically, the peripheral environment of a hard disk drive 10 is heated at a high temperature to set a general burn-in test condition (operation 301). This heating applies a high thermal stress to the hard disk drive 10 so that the hard disk drive 10 normally operates even in a bad condition to cope with a loss of a signal.

A process of optimizing a write current Wc, a read current Rc, a low-pass filter (LPF) coefficient, and a FIR filter tap is performed in operations 302 through 305. The write current Wc is optimized in consideration of the characteristics of the surfaces of the disk 12 and the write head. For example, the write current Wc is controlled by a pulse width modulation (PWM) signal corresponding to a write current control value. The write current control value is increased in each step within a predetermined range by the PWM signal, and a read test of a predetermined number of times is performed in each step. An optimal write current control value is set based on the number of errors occurring due to the read test.

The read current Rc is optimized to minimize the number of errors with respect to an electric response of a read head. The LPF coefficient is a boost value of a low-pass filter (LPF) used in processing an analog signal and is a value having minimum errors as a parameter to determine a frequency characteristic and the like. The FIR filter tap determines a tap of the FIR filter used in processing a digital signal and is a value having minimum errors.

The memory 50 stores the parameter values with respect to the write current Wc, the read current Rc, the LPF coefficient, and the FIR filter tap optimized in the general burn-in test as the first design parameters (operation 306). A pre-estimated failure condition of the hard disk drive 10 is set (operation 307). Data is repeatedly written on an n−1 track and an n+1 track. Next, if data is read from an n track and an automatic gain control (AGC) of a read signal is monitored, then, the AGC is increased in proportion to the number of writing data on an adjacent track. Here, if data is repeatedly written on the adjacent track, the AGC is linearly increased until the AGC is saturated due to leakage flux. The magnitude of a signal output from the head amplifier is inversely proportional to the AGC. Thus, the output of the head amplifier is linearly reduced in proportion to the number of writing data on the adjacent track.

Figures 5, 6:
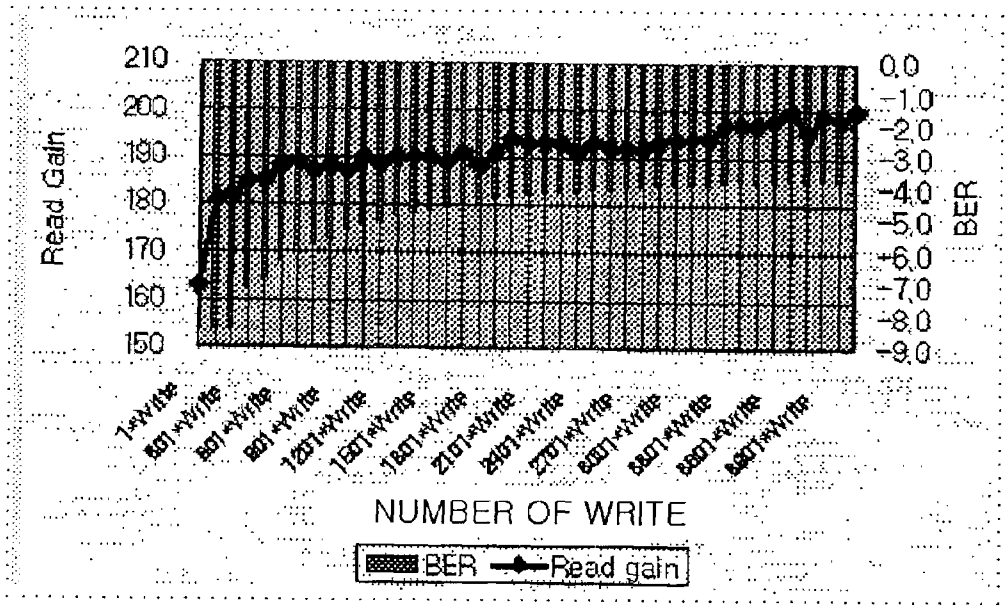
FIG. 5 is a view of the characteristic change of a bit per error rate (BER) based on the repetitive use in a head amplifier.
FIG. 6 is a table of parameters with respect to first, second, and third conditions of a FIR filter according to an embodiment of the invention.

A bit per error rate is increased with the reduction in the output of the head amplifier as shown in FIG. 5. In a magnetic device such as the hard disk drive 10, changes in physical properties and external environment due to changes in time are represented as the reduction in the output of the head amplifier. As a result, the design parameters related to signal processing optimized prior to the reduction (loss) of the head amplifier fail to optimize the hard disk drive 10 in an environment that has changed due to the repetitive use of the drive 10. Thus, errors occur in processing a signal.

In the present invention, a progressive failure condition pre-estimated in a user environment can be found by a repeated off-track writing process in the manufacturing process. Considering that a reduction in amplitude of the magnetic head 20 is a result of the deterioration of parts of the hard disk drive 10 due to the passage of time, the off-track writing process is repeated on a track adjacent to a track on which a test signal that serves as the basis of determining a coefficient is written. This process generates the progressive failure condition artificially. The off-track writing process is repeated until a failure occurs on a track that serves as the basis of determining the failure.

A process of optimizing the parameters related to the read current Rc, the LPF coefficient, and FIR filter tap corresponding to ones of the design parameters of the hard disk drive 10 related to the progressive failure of the hard disk drive is performed in the pre-estimated progressive failure condition in operations 308 through 310.

The memory 50 stores the parameters with respect to the read current Rc, the LPF coefficient, and the FIR filter tap, which are design parameters optimized in the pre-estimated progressive failure condition as the third design parameters (operation 311). An average of the first and third design parameters is set as the second design parameters and stored in the memory 50 to obtain design parameters suitable for an intermediate condition of the general burn-in test condition (first condition) and the pre-estimated progressive failure condition (third condition) (operation 312).

The first design parameters are set in accordance with the general burn-in test condition, the third design parameters are set in accordance with the pre-estimated progressive failure condition, and the second design parameters suitable for the intermediate condition are each stored in the memory 50. As such, the stored first, second, and third design parameters are retrievable according to changes in the use condition of the hard disk drive 10.

In the above embodiment, the first, second, and third design parameters are set in the first, second, and third conditions. However, if a design margin is large, only the first and third design parameters are set in the first and third conditions to be applied to a signal processing circuit of the hard disk drive 10. Thus, according to an embodiment of the invention, the second design parameters need not be set.

Figure 4:
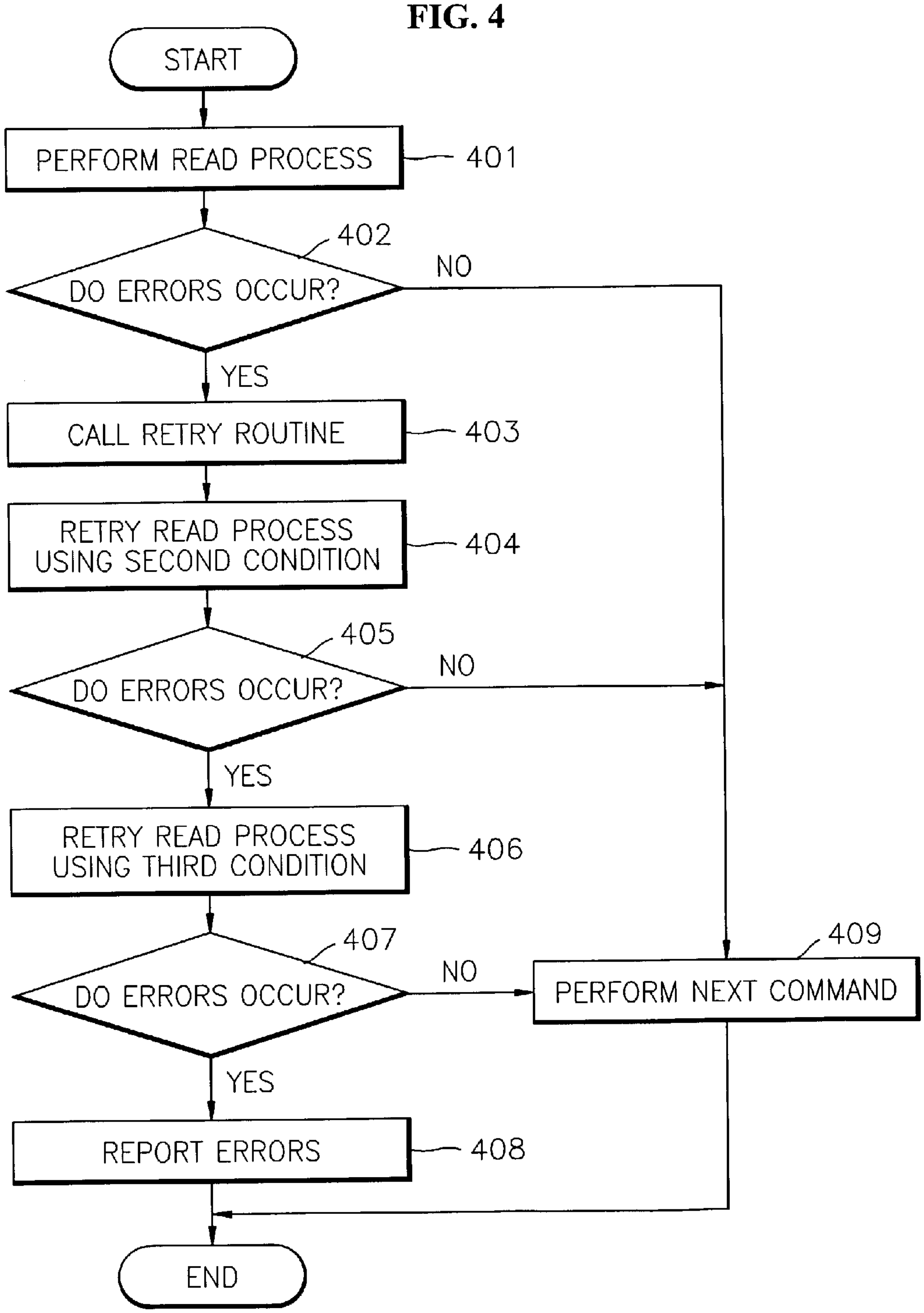
FIG. 4 is a flowchart of a method of applying design parameters of a data storage system according to a further embodiment of the present invention.

A method of processing a signal by applying first, second, and third design parameters set in various conditions to an actual hard disk drive 10 will be described with reference to a flowchart shown in FIG. 4. If the host interface 47 applies a read command to the system controller 42 of the hard disk drive 10, a read process is performed using the initial design parameters of a signal processor of the hard disk drive 10 as the first design parameters. The first design parameters are optimized in accordance with a general burn-in test condition (operation 401).

It is determined whether errors occur in the read process (operation 402). The system controller 42 requests a retry routine if errors occur (operation 403). The design parameters used in the hard disk drive 10 are changed to the second design parameters. The read process is then retried on a track on which errors occur (operation 404).

It is determined whether errors occur in the retried read process using the second design parameters (operation 405). If the errors still occur, the design parameters used in the hard disk drive 10 are changed to the third design parameters. The read process is again retried in a track on which errors occur (operation 406).

It is determined whether errors occur in the retried read process using the third design parameters (operation 407). If the errors continue, information that errors exist is generated and transmitted to the host computer (not shown) via the host interface 47 (operation 408).

If the errors do not occur at operations 402, 405, and 407, a next command input from the host interface 48 is carried out in operation 409.

FIG. 6 is a table of parameters of a FIR filter in first, third, and second design parameters A, B, and ((A+B)/2) according to an embodiment of the invention. When the table shown in FIG. 6 is applied to a drive on which errors occur due to the deterioration of parts in an actual customer environment, error rates according to the applied ones of the first, second, and third design parameters are shown in FIGS. 7 and 8.

Figure 7:
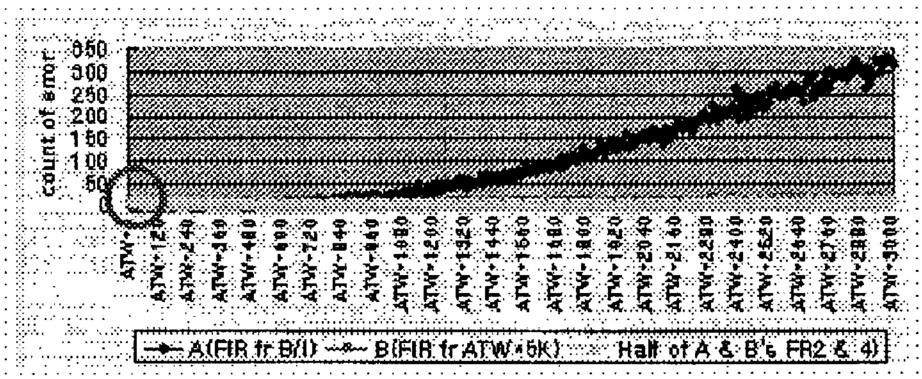
FIG. 7 is a curve graph of an error rate to which the table shown in FIG. 6 is applied.

As shown in FIG. 7, when the first design parameters A are applied, an error rate sharply deteriorates as the readout characteristic deteriorates due to the passage of time and repetitive use. When the third and second design parameters B and (Half of A & B) are applied, the error rate improves over that experienced using the first design parameters A even in the worst state.

Figure 8:
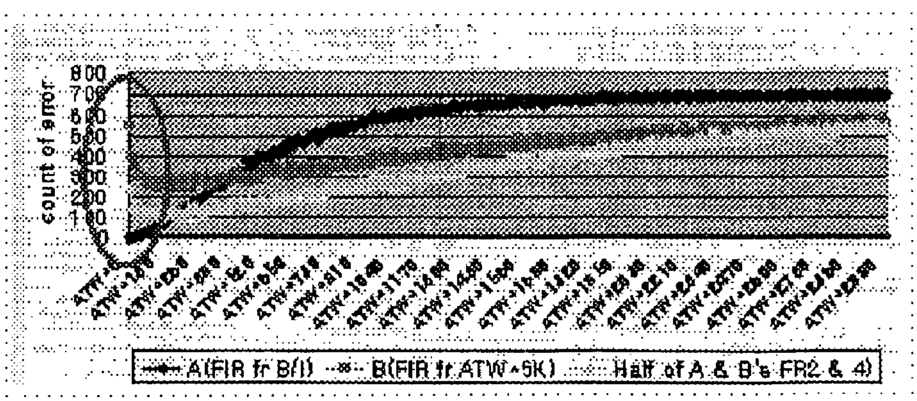
FIG. 8 is an extended zoom graph of the curve graph shown in FIG. 7.

As shown in FIG. 8, when the first design parameters A are applied, the error rate is good in the initial best state. However, the error rate sharply increases as time passes. In a case where the second and third conditions (half of A & B) and B are applied, the error rate increases more than in the first condition in the initial best condition. However, it is shown that the parameters are appropriate coefficients as the read sensor (head 20) deteriorates due to the passage of time and repetitive use. Accordingly, the readout characteristic amplitude is lower using the second and third design parameters than that which occurs using the first design parameters.

It can be pre-estimated that the readout characteristic becomes bad due to changes in external environment and physical properties of each component. The design parameters optimized in the second and third conditions set by such a pre-estimation are used to prevent failure and prolong the usable period of the product. As such, additional progressive failure conditions can be used to provide optimized parameters for each phase of a life of the hard disk drive.

In the above embodiment, design parameters are set in three conditions and changed whenever errors occur to perform a retry and a re-process of a signal. If a design margin is large, the signal may be processed using only design parameters of the first condition and design parameters of the third condition. However, it is also understood that more than three sets of parameters can be used to further account for the changes occurring over the lifetime of the hard disk drive.

As described above, according to the present invention, failures caused over the lifetime required for using a product and changes in characteristics of the product is pre-estimated. The design parameters which are used in a signal processor in the pre-estimated failure condition are optimized and stored. The design parameters are controlled to be changed if errors occur due to changes in a condition of use of a data storage system. As a result, the period and frequency of use guaranteed in the data storage system can be considerably extended.

The present invention can be executed as a method, an apparatus, or a system and the like. The elements of the present invention can be code segments which execute necessary tasks if the present invention is executed as software. Programs or code segments may be stored in a processor-readable medium or may be transmitted by a computer data signal combined with a carrier wave over a transmission medium or communication network. The processor readable medium may include any medium which is capable of storing or transmitting information. The processor readable medium includes an electronic circuit, a semiconductor memory device, a ROM, a flash memory, an erasable ROM (EROM), a floppy disk, an optical disk, a hard disk, an optical fiber medium, a radio frequency (RF) net, and the like. The computer data signal includes any signal which may be transmitted over a transmission medium such as an electronic network channel, an optical fiber, air, electromagnetic field, a RF network, and the like.

Specific embodiments described with reference to the attached drawings must be understood only as examples of the present invention and must not be interpreted as limiting the scope of the present invention. The present invention can be modified into various other forms in the art without departing from the spirit and scope of the invention as defined by the appended claims and equivalents thereof. Therefore, it is obvious that the present invention is not limited to the specific structure and arrangement shown and described above.

What is claimed is:

1. A method of optimizing design parameters used to operate a data storage system, the method comprising:
- determining and storing first design parameters to optimize the data storage system to operate while experiencing a general burn-in test condition;
- generating a progressive failure condition pre-estimated to occur in the data storage system;
- setting and storing third design parameters to optimize the data storage system to operate while experiencing the generated pre-estimated progressive failure condition;
- and storing averages of the first and third design parameters as second design parameters.

2. The method of claim 1, wherein the third design parameters comprise a predetermined regular variation characteristic with respect to the progressive failure condition.

3. The method of claim 2, wherein the third design parameters comprise variable values related to the setting of read current and filter coefficients.

4. The method of claim 1, wherein the general burn-in test condition comprises a condition during which the data storage system is operated in a heated environment outside of design operating conditions sufficient to impart a thermal stress on a recording medium used by the data storage system.

5. A method of optimizing design parameters used to operate a data storage system, the method comprising:
- determining and storing first design parameters to optimize the data storage system to operate while experiencing a general burn-in test condition;
- generating a progressive failure condition pre-estimated to occur in the data storage system; and
- setting and storing third design parameters to optimize the data storage system to operate while experiencing the generated pre-estimated progressive failure condition,
- wherein the pre-estimated progressive failure condition comprises a condition in which the data storage system performs off-track writing on a track of a recording medium adjacent to a target track until failure occurs.

6. A method of applying optimized design parameters for use by a data storage system when processing a signal, the method comprising:
- applying first design parameters to be used by the data storage system to process a signal, the first design parameters being parameters that optimize the data storage system to operate while experiencing a general burn-in test condition; and
- applying third design parameters to be used by the data storage system to re-process the signal if errors occur in the data storage system using the first design parameters, the third design parameters being parameters that optimize the data storage system to operate while experiencing a progressive failure condition,
- wherein the progressive failure condition comprises a condition in which the data storage system performs off-track writing on a track of a recording medium adjacent to a target track until failure occurs.

7. The method of claim 6, further comprising generating data to indicate that the errors occur if the errors occur in the operation of the data storage system using the third design parameters.

8. A method of applying optimized design parameters used in the operation of a data storage system when processing a signal in the data storage system, the method comprising:
- applying first design parameters to be used by the data storage system to process a signal, the first design parameters being parameters that optimize the data storage system to operate while experiencing a general burn-in test condition;
- applying second design parameters, which are set to averages of third design parameters and the first design parameters, to be used by the data storage system to re-process the signal if errors occur in the data storage system using the first design parameters, the third design parameters being parameters that optimize the data storage system to operate while experiencing a progressive failure condition; and
- applying the third design parameters to be used by the data storage system to again re-process the signal if errors occur in the data storage system using the second design parameters.

9. The method of claim 8, wherein the failure progressive condition comprises a condition in which the data storage system performs off-track writing on a track adjacent to a target track until failure occurs.

10. The method of claim 8, further comprising generating data to indicate that the errors occur if the errors occur in the data storage system to which the third design parameters have been applied.

11. A method of optimizing design parameters of a data storage system, the method comprising:

determining first design parameters that optimize the data storage system to operate while experiencing an initial condition;

determining third design parameters that optimize the data storage system to operate while experiencing a predetermined progressive failure condition; and storing the first and third design parameters for use by the data storage system, wherein the predetermined progressive failure condition simulates conditions occurring after a predetermined number of uses of the data storage system, and wherein, at the predetermined number of uses, the data storage system using the third design parameters experiences fewer errors than the data storage system using the first design parameters.

12. The method of claim 11, wherein the initial condition comprises a condition during which the data storage system is operated in a heated environment outside of design operating conditions sufficient to impart a thermal stress on a recording medium used by the data storage system.

13. The method of claim 11, further comprising determining second design parameters according to a mathematical relationship between the first and third design parameters.

14. A method of optimizing design parameters of a data storage system, the method comprising:

determining first design parameters that optimize the data storage system to operate while experiencing an initial condition;

determining third design parameters that optimize the data storage system to operate while experiencing a predetermined progressive failure condition;

determining second design parameters according to a mathematical relationship between the first and third design parameters; and storing the first and third design parameters for use by the data storage system, wherein: the predetermined progressive failure condition simulates conditions occurring after a predetermined number of uses of the data storage system; and the mathematical relationship used to determine the second design parameters estimates an intermediate condition of the data storage system prior to the predetermined number of uses and after an initial use.

15. A method of optimizing design parameters of a data storage system, the method comprising:

determining first design parameters that optimize the data storage system to operate while experiencing an initial condition;

determining third design parameters that optimize the data storage system to operate while experiencing a predetermined progressive failure condition;

determining second design parameters according to a mathematical relationship between the first and third design parameters; and storing the first and third design parameters for use by the data storage system, wherein the second design parameters are averages of the first and third design parameters.

16. A recording and/or reproducing apparatus to record and/or reproduce data with respect to a recording medium, comprising:

a head to record and/or reproduce the data with respect to the recording medium;

a driver to drive said head to record and/or reproduce the data with respect to the recording medium;

a processor to process the data to be recorded and/or reproduced using said head;

a memory to store first and third design parameter sets, the first design parameter set comprising design parameters that optimize the recording and/or reproducing apparatus to operate at an initial condition, and the third design parameter set comprising design parameters that optimize the recording and/or reproducing apparatus to operate at another condition occurring after a preset number of uses; and a controller to control said driver to drive said head, to detect whether data recording and/or reproducing errors exceed a reference value, and, if the recording and/or reproducing errors exceed the reference value after the recording and/or reproducing apparatus has operated using the first design parameter set, to retrieve the third design parameter set from said memory and to operate the recording and/or reproducing apparatus to record and/or reproduce the data using the third design parameter set.

17. The recording and/or reproducing apparatus of claim 16, further comprising a FIR filter, wherein:

the first design parameter set comprises a first FIR filter tap optimized to provide minimum error values when the recording and/or reproducing apparatus is operated at the initial condition, the third design parameter set comprises a third FIR filter tap optimized to provide minimum error values when the recording and/or reproducing apparatus is operated after the preset number of uses, and said controller controls said FIR filter to exchange the first and third FIR filter taps when the recording and/or reproducing errors exceed the reference value after the recording and/or reproducing apparatus has operated using the first design parameter set.

18. The recording and/or reproducing apparatus of claim 16, further comprising a low pass filter (LPF), wherein:

the first design parameter set comprises a first LPF coefficient optimized to provide minimum error values when the recording and/or reproducing apparatus is operated at the initial condition, the third design parameter set comprises a third LPF coefficient optimized to provide minimum error values when the recording and/or reproducing apparatus is operated after the preset number of uses, and said controller controls said LPF to exchange the first and third LPF coefficients when the recording and/or reproducing errors exceed the reference value after the recording and/or reproducing apparatus has operated using the first design parameter set.

19. The recording and/or reproducing apparatus of claim 16, wherein:

the first design parameter set comprises first read and/or write current parameters to optimize a read current and/or a write current to provide minimum error values when the recording and/or reproducing apparatus is operated at the initial condition, the third design parameter set comprises third read and/or write current parameters to optimize the read current and/or the write current to provide minimum error values when the recording and/or reproducing apparatus is operated after the preset number of uses, and said controller exchanges the first and third read and/or write current parameters when the recording and/or reproducing errors exceed the reference value after the recording and/or reproducing apparatus has operated using the first design parameter set.

20. The recording and/or reproducing apparatus of claim 16, further comprising an interface with which information is communicated to and from the recording and/or reproducing apparatus, wherein said controller further detects whether the recording and/or reproducing errors occur while operating the recording and/or reproducing apparatus using the third parameter set, and indicates through said interface that the recording and/or reproducing errors occur while operating using the third parameter set.

21. The recording and/or reproducing apparatus of claim 16, wherein:

said memory further stores a second parameter set corresponding to operating the recording and/or reproducing apparatus at an intermediate condition after the initial condition and prior to the predetermined number of uses, and if the recording and/or reproducing errors exceed the reference value while the recording and/or reproducing apparatus is operating using the first design parameter set, said controller retrieves the second design parameter set from said memory and operates the recording and/or reproducing apparatus to record and/or reproduce data using the second design parameter set, if the recording and/or reproducing errors exceed the reference value while the recording and/or reproducing apparatus is operating using the second design parameter set, said controller retrieves the third design parameter set from said memory and operates the recording and/or reproducing apparatus to record and/or reproduce data using the third design parameter set.

22. The recording and/or reproducing apparatus of claim 21, wherein the second parameter set comprises a mathematical simulation of the intermediate condition based upon the first and third design parameter sets.

23. The recording and/or reproducing apparatus of claim 22, wherein the second parameter set comprises an average of the first and third parameter sets.

24. The recording and/or reproducing apparatus of claim 16, wherein:

the initial condition comprises a general burn-in test condition; and the another condition comprises a progressive failure condition.

25. The recording and/or reproducing apparatus of claim 24, wherein:

the general burn-in test condition comprises operating the recording and/or reproducing apparatus at an elevated temperature exceeding normal design operating conditions so as to induce thermal stress in the recording medium during the recording and/or reproduction of the data, and the progressive failure condition is a pre-estimated failure condition in which the recording and/or reproducing apparatus performs off-track writing on a track on the recording medium adjacent to a designated track until failure occurs.

26. A computer readable storage medium encoded with processing instructions for performing a method of operating a recording and/or reproducing apparatus as performed by a computer, the method comprising:

operating the recording and/or reproducing apparatus using a first design parameter set, the first design parameter set comprising parameters optimized to operate the recording and/or reproducing apparatus at an initial condition; and if errors are detected in the recording and/or reproducing of data with respect to a recording medium after the recording and/or reproducing apparatus has operated using the first design parameter set, exchanging the first design parameter set with a third design parameter set and operating the recording and/or reproducing apparatus using the third design parameter set, the third design parameter set comprising parameters optimized to operate the recording and/or reproducing apparatus at another condition occurring after the operation of the recording and/or reproducing apparatus for a predetermined number of uses.

27. The computer readable storage medium of claim 26, wherein the another condition comprises a progressive failure condition.

28. The computer readable storage medium of claim 27, wherein the second parameter set comprises a mathematical simulation of an intermediate condition based upon the first and third design parameter sets.

29. The computer readable storage medium of claim 28, wherein the second parameter set comprises an average of the first and third parameter sets.

30. The computer readable storage medium of claim 26, wherein said exchanging the first design parameter set with the third design parameter set comprises:

if the errors are detected in the recording and/or reproducing of the data with respect to the recording medium after the recording and/or reproducing apparatus has operated using the first design parameter set, exchanging the first design parameter set with a second design parameter set and operating the recording and/or reproducing apparatus using the second design parameter set, the second design parameter set corresponding to a mathematical relationship between the first and third design parameter sets, and exchanging the second design parameter set with the third design parameter set if the errors are detected in the recording and/or reproducing of the data with respect to the recording medium after the recording and/or reproducing apparatus has operated using the second design parameter set.

31. The computer readable storage medium of claim 26, wherein:

the first design parameter set comprises a first FIR filter tap optimized to provide minimum error values when the recording and/or reproducing apparatus is operated at the initial condition, the third design parameter set comprises a third FIR filter tap optimized to provide minimum error values when the recording and/or reproducing apparatus is operated after the preset number of uses, and said exchanging the first design parameter set with the third design parameter set comprises exchanging the first and third FIR filter taps used in a FIR filter of the recording and/or reproducing apparatus.

32. The computer readable storage medium of claim 26, wherein:

the first design parameter set comprises a first low pass filter (LPF) coefficient optimized to provide minimum error values when the recording and/or reproducing apparatus is operated at the initial condition, the third design parameter set comprises a third LPF coefficient optimized to provide minimum error values when the recording and/or reproducing apparatus is operated after the preset number of uses, and said exchanging the first design parameter set with the third design parameter set comprises exchanging the first and third LPF coefficients of an LPF of the recording and/or reproducing apparatus.

33. The computer readable storage medium of claim 26, wherein:

the first design parameter set comprises first read and/or write current parameters to optimize a read current and/or a write current to provide minimum error values when the recording and/or reproducing apparatus is operated at the initial condition, the third design parameter set comprises third read and/or write current parameters to optimize the read current and/or the write current to provide minimum error values when the recording and/or reproducing apparatus is operated after the preset number of uses, and said exchanging the first design parameter set with the third design parameter set comprises exchanging the first and third read and/or write current parameters of the recording and/or reproducing apparatus.

34. The computer readable storage medium of claim 26, the method further comprising:

detecting whether the errors occur while operating the recording and/or reproducing apparatus using the third parameter set, and indicating that the errors occur while operating the recording and/or reproducing apparatus using the third parameter set through an interface used by the recording and/or reproducing apparatus to communicate information.

35. The computer readable storage medium of claim 26, wherein:

the initial condition is a general burn-in test condition in which the recording and/or reproducing apparatus is operated at an elevated temperature exceeding normal design operating conditions so as to induce thermal stress in the recording medium during the recording and/or reproduction of the data, and the another condition comprises a pre-estimated progressive failure condition in which the recording and/or reproducing apparatus performs off-track writing on a track on the recording medium adjacent to a designated track until failure occurs.

* * * * *